United States Patent
Unckrich

Patent Number: 5,193,778
Date of Patent: Mar. 16, 1993

[54] SUSPENSION ARRANGEMENT FOR EXHAUST INSTALLATIONS

[75] Inventor: Volker Unckrich, Plüderhausen, Fed. Rep. of Germany

[73] Assignee: Mercedes-Benz AG, Stuttgart, Fed. Rep. of Germany

[21] Appl. No.: 840,186

[22] Filed: Feb. 24, 1992

[30] Foreign Application Priority Data

Mar. 6, 1991 [DE] Fed. Rep. of Germany ....... 4107185

[51] Int. Cl.$^5$ ............................................ F16M 13/00
[52] U.S. Cl. ................................... 248/610; 180/89.2
[58] Field of Search ................. 248/610, 60, 638, 634, 248/635; 180/312, 299, 902, 292, 89.2; 267/152

[56] References Cited

U.S. PATENT DOCUMENTS

| | | | |
|---|---|---|---|
| 680,609 | 8/1901 | Marquardt | 248/60 |
| 3,977,486 | 8/1976 | Kleinschmit | 248/610 X |
| 4,086,977 | 5/1978 | Heiland | 248/610 X |
| 4,296,907 | 10/1981 | Ishida | 248/634 |
| 4,309,019 | 1/1982 | Bloom | 248/610 |
| 4,638,965 | 1/1987 | Bruine | 180/89.2 X |
| 4,676,332 | 6/1987 | Saito | 267/292 X |
| 4,817,909 | 4/1989 | Deane | 267/152 X |
| 4,972,921 | 11/1990 | Takada et al. | |

FOREIGN PATENT DOCUMENTS

| | | |
|---|---|---|
| 1505498 | 9/1969 | Fed. Rep. of Germany . |
| 2658358 | 6/1978 | Fed. Rep. of Germany . |
| 2803270 | 8/1979 | Fed. Rep. of Germany . |
| 3916872 | 11/1990 | Fed. Rep. of Germany . |
| WO9114185 | 9/1991 | PCT Int'l Appl. . |
| 2127126 | 4/1984 | United Kingdom ........... 248/60 |

Primary Examiner—J. Franklin Foss
Attorney, Agent, or Firm—Evenson, Wands, Edwards, Lenahan & McKeown

[57] ABSTRACT

A suspension arrangement for exhaust installations on motor vehicles, in particular exhaust installations with large-area, flat designs of mufflers joined together by means of an upper shell and a lower shell. The arrangement creates an elastic muffler suspension which is near the center of gravity, is space-saving and close to the vehicle bottom but is still easy to assemble. The arrangement has a hollow profile type of component protruding through the muffler at its center of gravity and essentially at right angles to the vehicle bottom, open at its outer ends and solidly connected to the upper shell and the lower shell, and is positively connected to the elastic suspension part fastened to the vehicle bottom.

7 Claims, 2 Drawing Sheets

SUSPENSION ARRANGEMENT FOR EXHAUST INSTALLATIONS

BACKGROUND AND SUMMARY OF THE INVENTION

The present invention relates to a suspension arrangement for exhaust installations under the vehicle bottom of motor vehicles by means of elastic suspension parts.

Conventional exhaust installations are, as may be seen from German Patent Document 28 03 270 Al, fastened to the vehicle bottom by means of elastic suspension parts. The selection of the suspension points must then take account of ease of assembly so that the optimum suspension points above the center of gravity of, in particular, relatively large-area, flat designs of mufflers are usually excluded because of inaccessibility. The suspension on the exhaust pipe or on the edge regions of the mufflers, imposed by this difficulty and remote from the center of gravity, leads however to increased mechanical loads on the exhaust installation, which demands complicated measures to increase stability or additional suspension arrangements, particularly at the critical transition locations where the exhaust pipe is welded into the muffler.

In addition, increased vibrational motions of the exhaust installation occur because the muffler suspension is remote from the center of gravity. These in turn increase the mechanical loads and impose increased distances from the adjacent components.

Elastic suspension parts suitable for the suspension of exhaust installations are known, from German Patent Document 26 58 358 Al, which shows, for example, an advantageous construction with steel inserts.

In addition, a muffler is known from German Patent Document 39 16 872 Cl, this muffler being penetrated by through openings for fastening screws used to hold the muffler on the engine. The suspension on the engine achieved by means of this arrangement, however, concerns a muffler for engines for small units and is not suitable for an elastic suspension of an exhaust installation under the bottom of motor vehicles.

An object of the invention is to provide a space-saving muffler suspension close to the vehicle bottom which is, however, easy to assemble.

This and other objects are achieved by embodiments of the present invention which provide a suspension arrangement for exhaust installations under a vehicle bottom of a motor vehicle and comprises at least on elastic suspension part and at least one muffler. The muffler has wall parts and a hollow profile component part passing through the wall parts substantially at right angles to the vehicle bottom. The hollow profile component is open at the ends and is solidly connected to the wall parts. The hollow profile component passes through the muffler at the center of gravity of the muffler and is positively connected with the elastic suspension part. The elastic suspension part is fastened to the vehicle bottom and has a longitudinal extension mainly located in an internal space of the hollow profile component.

Because of the easily assembled and elastic suspension of an exhaust installation of a motor vehicle, according to the present invention, and particularly a suspension arrangement close to the vehicle bottom at the center of gravity of relatively large-area, flat designs of mufflers, the mechanical load on the exhaust installation can be substantially reduced while retaining a minimum number of suspension points. In consequence, otherwise necessary measures to increase strength become unnecessary and the number of otherwise necessary suspension points can be minimized.

Because of the smaller vibrational motion of the exhaust installation achieved on account of the suspension arrangement according to the invention, the distance necessary from adjacent components can also be minimized so that, in effect, a smaller installation space is necessary or, alternatively, the mufflers can have larger dimensions.

Other objects, advantages and novel features of the present invention will become apparent from the following detailed description of the invention when considered in conjunction with the accompanying drawings.

BRIEF DESCRIPTION OF THE DRAWINGS

FIG. 5 shows a longitudinal section through a suspension arrangement according to another embodiment of the present invention.

DETAILED DESCRIPTION OF THE DRAWINGS

A relatively large-area, flat design of a muffler 1, having an external shape formed by an upper shell 2 and a lower shell 3 solidly connected to the upper shell 2, is integrated into the exhaust installation via an exhaust pipe 4.

Figure 1:
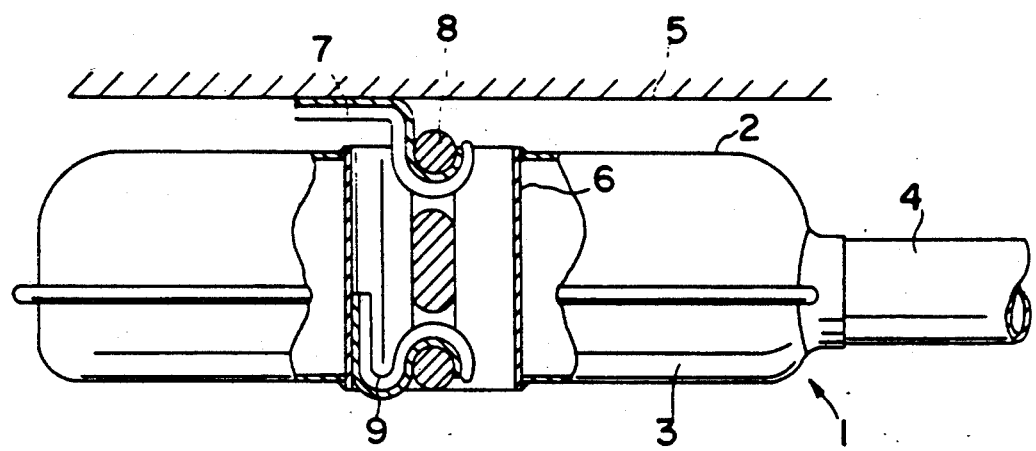
FIG. 1 shows a suspension arrangement according to an embodiment of the present invention in a longitudinal section of a muffler shown in side view.
Figure 2:
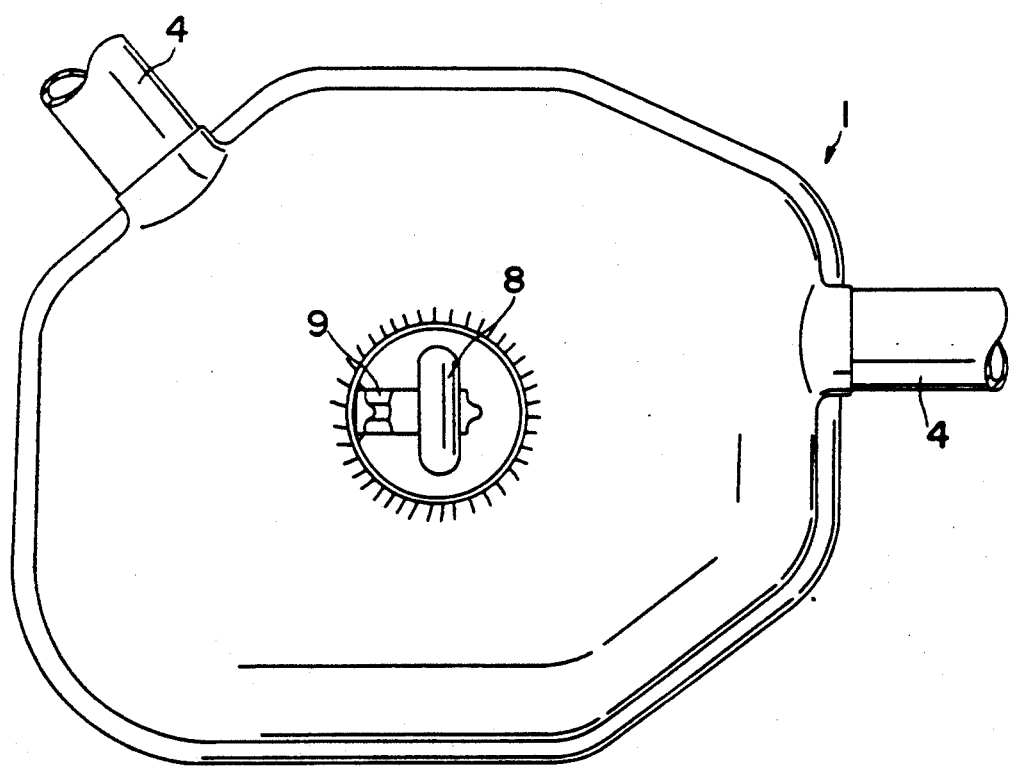
FIG. 2 shows the suspension arrangement of FIG. 1 in a plan view.

A hollow profile type of component, preferably a pipe piece 6, is passed through the center of gravity of the muffler at right angles to the vehicle bottom 5. This pipe piece 6 terminates at the upper shell 2 and at the lower shell 3 and is welded to these. The pipe piece 6 is dimensioned in such a way that an elastic suspension part 8 hooked over a bracket 7 fastened to the vehicle bottom 5 can be passed through the pipe piece 6. The elastic suspension part 8 is a substantially annular or oval preform consisting of rubber or a material similar to rubber. At its ends, it has openings or other shaped areas for hooking onto the vehicle-side bracket 7 and the exhaust-side fastening element, it being possible for the long sides of the oval preform to be connected by webs. Appropriate connections for the employment of a fitting tool can be provided. In accordance with the embodiment of FIGS. 1 and 2, a hook 9 is solidly attached in the pipe piece 6 opposite to the bracket 7 on the vehicle bottom 5 and the elastic suspension part 8 can be hooked onto the hook 9 without difficulty by means of a fitting tool.

Figure 3:
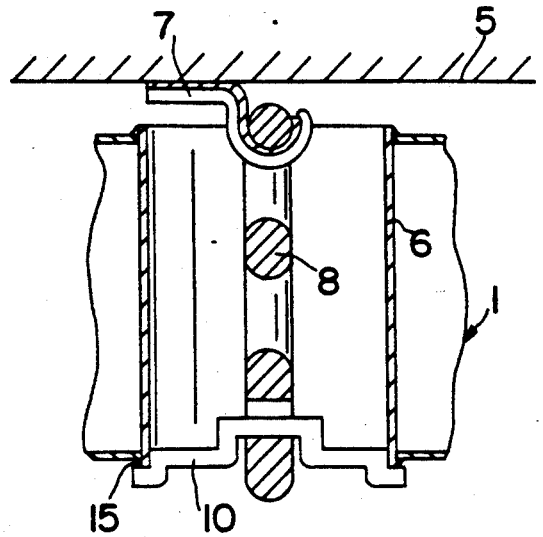
FIGS. 3 and 5 shows a longitudinal section through a suspension arrangement according to another embodiment of the present invention.
Figure 4:
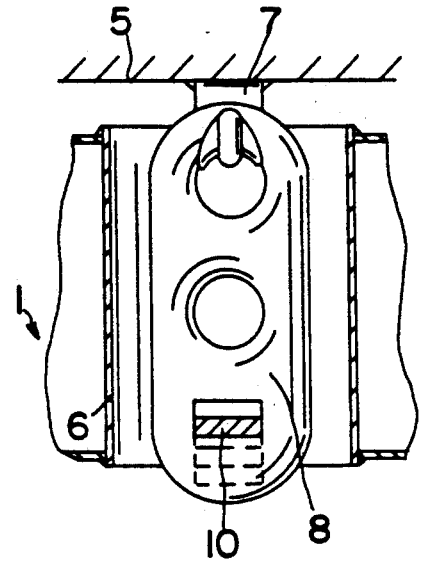
FIG. 4 shows a longitudinal section, rotated by 90°, of the view of the embodiments shown in FIG. 3.

In an illustrative example shown in FIGS. 3 and 4, a hook 9 solidly attached in the pipe piece 6 is omitted. Instead of this, a stirrup-piece 10 supported on the end of the pipe piece 6 remote from the vehicle bottom is passed through the elastic suspension part 8. In order to assemble the stirrup-piece 10, the elastic suspension part 8 must be stretched by means of a fitting tool to the extent that the stirrup-piece 10 can be passed freely through the corresponding opening in the elastic suspension part 8. After assembly, the stirrup-piece 10 is positively secured against independent release by the weight of the muffler 1 and by the prestress in the elastic suspension part 8. The stirrup-piece 10 is positively secured because the stirrup-piece 10, supported at both sides on the end of the pipe piece 6, is stepped in a plurality of stages into the pipe piece 6 in such a way that sideways displacement of the stirrup-piece 10 on the pipe piece 6 and of the elastic suspension part 8 on the stirrup piece 10 is prevented.

Figure 5:
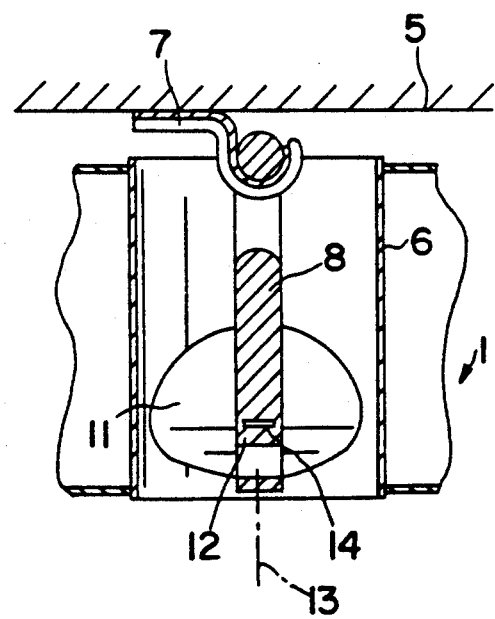
Figure 6:
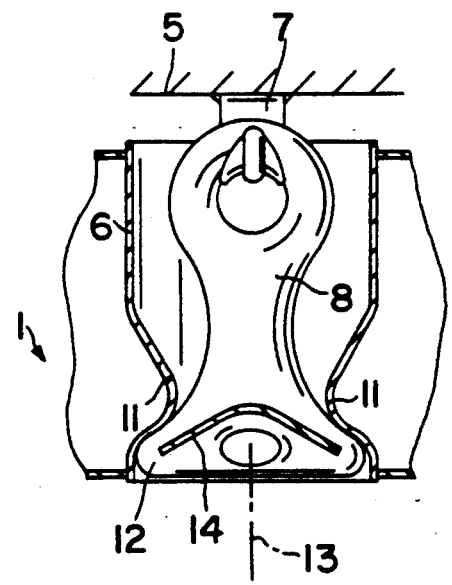
FIG. 6 shows a longitudinal section, rotated by 90°, of the view of the embodiments shown in FIG. 3.

In the illustrative example of the embodiment of FIGS. 5 and 6, the pipe piece 6 is provided with two mutually opposite protrusions 11 protruding into the free cross-section of the pipe piece 6. In this embodiment, the end of the elastic suspension part 8 remote from the vehicle bottom 5 is designed as a clamping part 12 spreading out towards the end between the protrusions 11. Thus, by means of a quarter rotation about the longitudinal axis 13 (which can be carried out with the aid of a fitting tool) and a simultaneous longitudinal extension, the suspension part 8 can be passed through the pipe piece 6 and its narrow side can be passed through between the protrusions 11. Once it has been turned back into the normal position and the longitudinal extension is retracted, the clamping part 12 is supported on the protrusions 11 and the intended positive connection is achieved.

The stability of the clamping part 12 positively held between the protrusions 11 can be additionally and substantially increased by vulcanizing in a sheet metal stiffener 14.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A suspension arrangement for exhaust installations under a vehicle bottom of a motor vehicle, comprising:
   at least one elastic suspension part;
   at least one muffler which has wall parts and a hollow profile component passing through said wall parts substantially at right angles to the vehicle bottom, said hollow profile component being open at the ends and solidly connected to said wall parts, wherein said hollow profile component passes through the muffler at the center of gravity of said muffler and is positively connected with the elastic suspension part, said elastic suspension part being fastened to the vehicle bottom and having a longitudinal extension mainly located in an internal space of the hollow profile component.

2. The suspension arrangement according to claim 1, wherein the positive connection between the elastic suspension part and the hollow profile component includes a hook attached in the hollow profile component.

3. The suspension arrangement according to claim 1, wherein the positive connection between the elastic suspension part and the hollow profile component includes a stirrup-piece supported on the edge of the hollow profile component and protruding beyond the edge of the hollow profile component through the elastic suspension part on both sides.

4. The suspension arrangement according to claim 1, wherein the positive connection between the elastic suspension part and the hollow profile component include at least two mutually opposite protrusions protruding into the free internal space of the hollow profile component, the elastic suspension part having a clamping part that is appropriately matched to the narrowed internal space and is passed through the hollow profile component and in a first position is rotated about the longitudinal axis by approximately a quarter of a rotation relative to a normal position and is clamped by turning back into the normal position between the protrusions.

5. The suspension arrangement according to claim 4, further comprising a sheet metal stiffener, which increases stability, said sheet metal stiffener being vulcanized in the clamping part.

6. The suspension arrangement according to claim 1, wherein the muffler is a large-area, flat design muffler comprising a joined together upper shell and a lower shell.

7. The suspension arrangement according to claim 1, wherein the hollow profile component is a pipe piece welded to an upper shell and a lower shell of said muffler.

* * * * *